United States Patent [19]

Kim

[11] Patent Number: 5,838,137
[45] Date of Patent: Nov. 17, 1998

[54] METHOD FOR DETERMINING OPTIMAL CAPACITY OF AUXILIARY ELECTRIC SOURCE SYSTEM FOR AN ELECTRIC VEHICLE

[75] Inventor: Chun-ho Kim, Kwangmyung, Rep. of Korea

[73] Assignee: KIA Motors Corporation, Seoul, Rep. of Korea

[21] Appl. No.: 688,886

[22] Filed: Jul. 31, 1996

[51] Int. Cl.$^6$ ........................................................ H02J 7/04
[52] U.S. Cl. .......................................... 320/43; 323/234
[58] Field of Search .................................. 320/5, 12, 21, 320/30, 48, 13, 37, 43, 44; 395/750.01; 318/139; 363/95, 123

[56] References Cited

U.S. PATENT DOCUMENTS 4,307,330  12/1981  Belot ........................................ 320/44
5,539,318  7/1996  Sasaki ..................................... 324/428

*Primary Examiner*—Peter S. Wong
*Assistant Examiner*—Shawn Riley

[57] ABSTRACT

In a method for determining an optimal capacity of a DC/DC converter for an electric vehicle, there is statistical modelling of firm loads and instantaneous loads with frequency and duty-on ratio, by summing up firm loads, arranging instantaneous loads in a way in which a turn-ON time of each instantaneous load does not occur simultaneously during a cycle in which another instantaneous load occurs, obtaining a total load by summing up the instantaneous loads and the firm loads during a particular cycle, and determining a capacity of the DC/DC converter such that, during the cycle, the amount of a charged capacity and the amount of a discharged capacity of an auxiliary battery are approximately the same.

4 Claims, 4 Drawing Sheets

BATTERY

METHOD FOR DETERMINING OPTIMAL CAPACITY OF AUXILIARY ELECTRIC SOURCE SYSTEM FOR AN ELECTRIC VEHICLE

TECHNICAL FIELD

The present invention relates to a method for determining optimal capacity of an auxiliary electric source system for an electric vehicle.

BACKGROUND ART

Generally, electric vehicles were in practical use even before gasoline vehicles were invented. However, since the gasoline vehicle was more rapidly developed due to its superior accelerating ability, mounting ability, driving ability and highest speed, the electric vehicle gradually disappeared.

However, in recent years, the electric vehicle is considered to have less adverse impact on the environment. Therefore, many parts of the electric vehicle, for example, an auxiliary electric source device, a controller, an electric motor and a drive system, have been examined and developed.

Particularly, the auxiliary electric source generally comprises a DC/DC converter and an auxiliary battery. The DC/DC converter is a device for converting a high voltage of a traction battery (which has a voltage of about 312 V) into a voltage of about 12 V which can be used as an auxiliary electric source. That is, the DC/DC converter has the same function as an alternator used in a conventional gasoline vehicle. The auxiliary battery has the same function as a battery of the conventional gasoline vehicle, which has a voltage of about 12 V.

Namely, the auxiliary electric source device is a device for supplying an auxiliary electric source of about 12 V required for operating many parts of the vehicle, for example, a controller, a power window, a wiper, a lamp, a rear defroster, a water pump, and a vacuum pump. Therefore, there have been efforts to improve the device efficiency. To improve the device efficiency, it is important to optimize the capacity of the device.

To determine the capacity of the auxiliary electric source system of the electric vehicle, a method for determining the capacity of the conventional alternator has been used without research on optimizing the capacity of the auxiliary electric source system of the electric vehicle.

The conventional gasoline vehicle consumes a large amount of electric power by a start motor, while the electric vehicle uses only a relatively small amount in comparison. Therefore, there is a need for research for determining the optimal capacity of the auxiliary electric source system for the electric vehicle.

According to the method for determining the capacity of the conventional alternator, the loads on which the auxiliary electric source system is applied are classified into firm loads and instantaneous loads. Firm loads are defined as the loads of the parts such as a lamps, an audio system and so forth that usually maintain a turned-on state for a long time. Instantaneous loads are defined as the loads of the parts such as an air conditioner, a radiator pan, a brake lamp, and a brake pump, etc that can be intermittently turned ON and maintains turned-on state for a short time.

Each use frequency of the instantaneous loads and the firm loads are determined from the experience and generally is determined in a range from 0 to 1. According to the method used in the prior art, the capacity of a DC/DC converter is -determined by multiplying the loads by their use frequency, and summing. This can be expressed with the following equation:

$$P = \Sigma P_i f_i$$

where, i=load index

Pi=consumption power of each load fi=use frequency in which each firm load is 1 and each instantaneous load is in a range from 0 to 1.

However, this method does not consider the characteristics of the charge and discharge of the battery as well as the relative relationship of a switch ON time among instantaneous loads, resulting in deterioration of reliability with respect to the optimal capacity determination.

SUMMARY OF THE INVENTION

Therefore, the present invention has been made in an effort to solve the above described problems.

It is an object of the present invention to provide a method for determining optimal capacity of an auxiliary electric source system for an electric vehicle, in which the characteristics of the charge and discharge of the battery as well as the use relationship of the instantaneous loads is fully considered.

To achieve the above object, the present invention provides a method for determining an optimal capacity of an auxiliary electric source system for an electric vehicle, comprising the steps of:

summing up firm loads;

determining load, use frequency, and duty-on ratio of each instantaneous load;

arranging instantaneous loads in a way that a turn-ON time of each instantaneous load does not occur simultaneously during a cycle in which another instantaneous load occurs;

obtaining a total load by summing up the instantaneous loads and the firm loads during a particular cycle; and determining a capacity of the DC/DC converter such that during the cycle; the amount of a charged capacity and the amount of a discharged capacity of an auxiliary battery are approximatily the same.

DESCRIPTION

According to a method for determining the optimal capacity of an auxiliary electric source system in accordance with the present invention, the optimal capacity of the auxiliary electric source is determined in consideration of use relationships among each instantaneous load.

First, firm loads are selected and summed up. Firm loads are the loads that are applied by the parts of the vehicle that can be turned on frequently and maintain the turn-ON state for a long time. For example, the audio system and lamp can be simultaneously turned on and maintained in that state for a long time. Thus for calculation of a total load, every firm load should be summed up.

Next, each instantaneous load which is applied on each part, for example an air conditioner, a radiator pan, a brake lamp, and a brake pump, etc. that can be intermittently turned ON and does not maintain the turned ON state for a long time is selected. The frequency and duty ratio of use can be defined by experience.

As shown in FIGS. 1A–1D, each load is simplified from test data and modeled as a step function. Next, the instantaneous loads are arranged such that the switch ON timings of each instantaneous load should not be overlaid since it is rare that a driver turns ON many loads simultaneously. Next, the cycle that the instantaneous loads can be repeated is chosen by experience. The firm loads and every instantaneous load within the cycle are summed to define the total load. By this procedure, mathematical modeling with respect to the total load is accomplished.

Also the auxiliary electric source system need to be modeled.

Figure 1A:
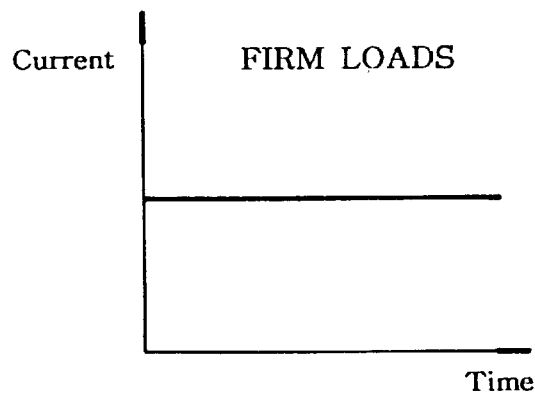
FIG. 1 is a graphical illustration showing a procedure for obtaining a total load by adding each instantaneous load to a firm load.
Figure 1B:
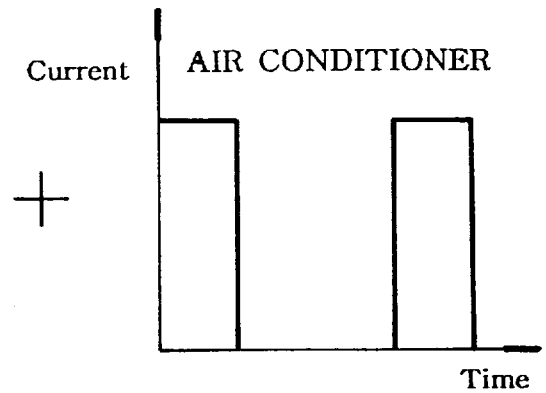
Figure 1C:
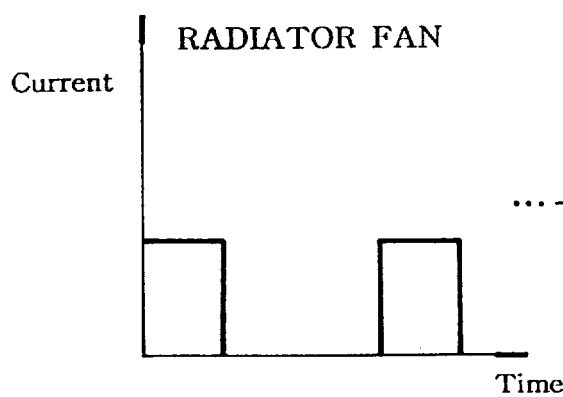
Figure 1D:
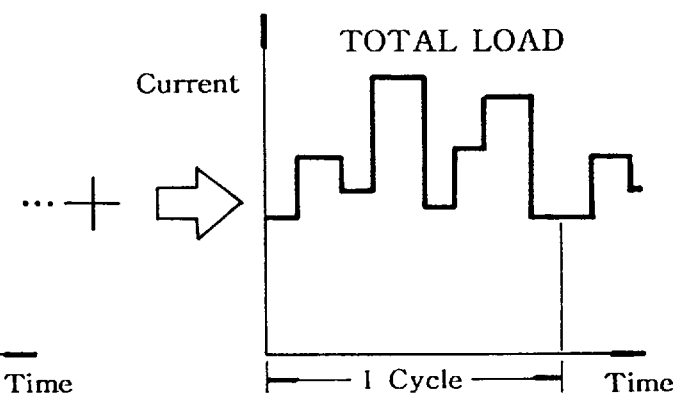
Figure 2A:
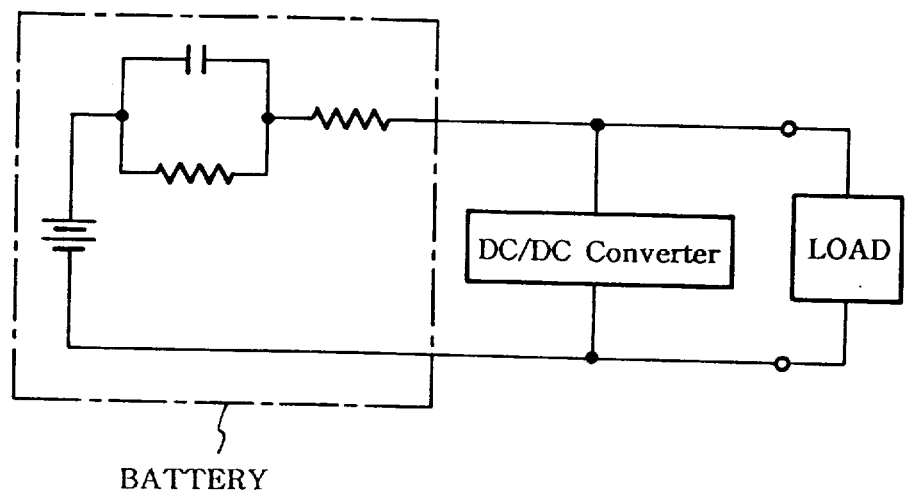
FIG. 2A is a circuit diagram illustrating an auxiliary electric source system of an electric vehicle.
Figure 2B:
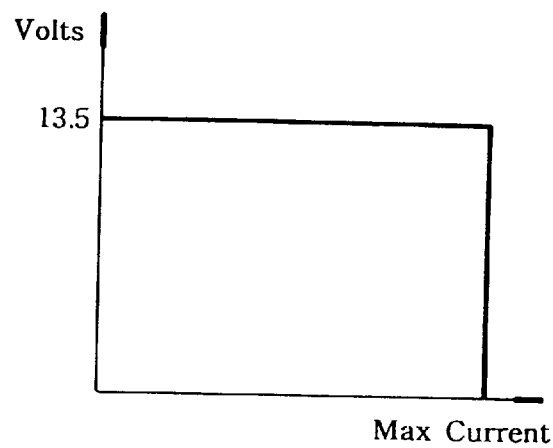
FIG. 2B is a graphical illustration showing a comparison of a voltage with a maximum current of a DC/DC converter.

As shown in FIGS. 2A and 2B, since a DC/DC converter has a voltage regulating function therein, the DC/DC converter outputs constant voltage until a maximum current is supplied.

The constant voltage is preset at a voltage of about 13.5 V (see FIG. 2B). The auxiliary electric source system includes the DC/DC converter and the battery which are arranged parallel to each other (see FIG. 2A).

Accordingly, the DC/DC converter supplies a maximum current to each part of the vehicle when a load higher than the capacity of the DC/DC is required. At this point, the electric current which is wanting, is supplied from the auxiliary battery. That is, the battery is discharged.

Further, when a load lower than the capacity of the DC/DC converter is required, the DC/DC converter supplies all necessary current sufficiently and rest current from the DC/DC converter is used for charging the battery as a constant voltage of about 13.5 V.

Figure 3A:
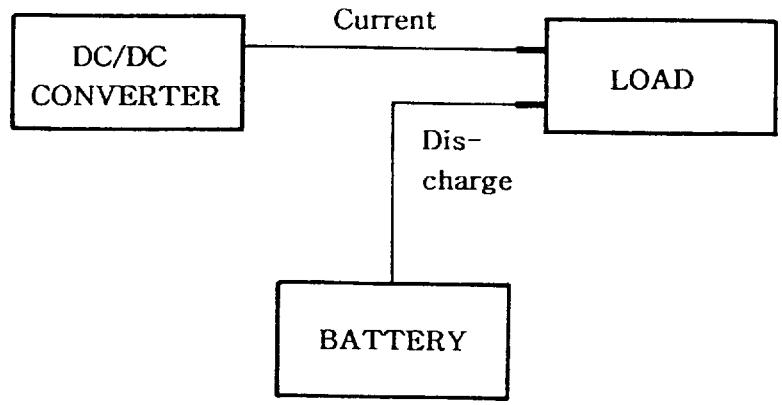
FIG. 3A is a block diagram illustrating a state that load applied to an auxiliary electric source system is over the capacity of the DC/DC converter.
Figure 3B:
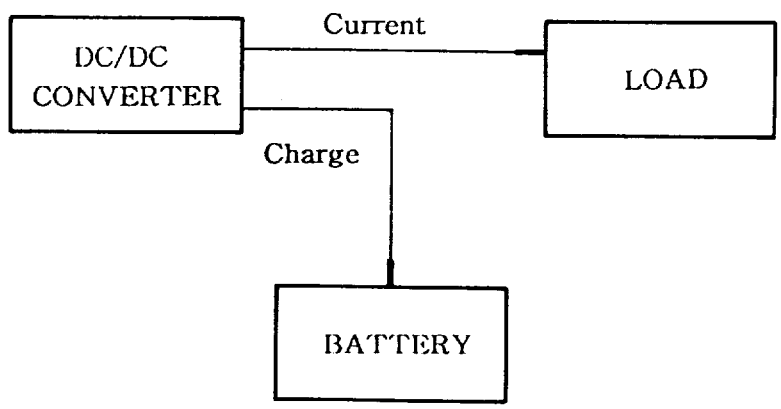
FIG. 3B is a block diagram illustrating a state that load applied to an auxiliary electric source system is below the capacity of the DC/DC converter.

As shown in FIG. 3A and 3B, the battery is discharged when the overload is required and is charged when the low load is required.

Accordingly, the battery is charged and discharged repeatedly in accordance with the load applied to the auxiliary electric source.

With the modeling of the total load and the auxiliary electric source system an optimal capacity for the DC/DC converter can be selected.

Figure 4A:
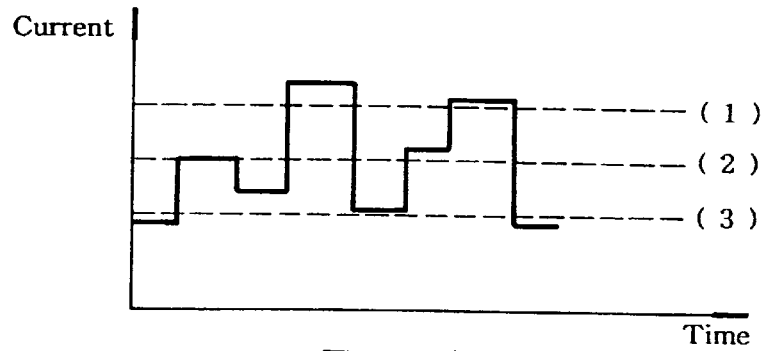
FIG. 4A, 4B, 4C, and 4D are graphical illustrations showing a comparison charge/discharge states in accordance with a capacity of the DC/DC converter of the auxiliary electric source system.
Figure 4B:
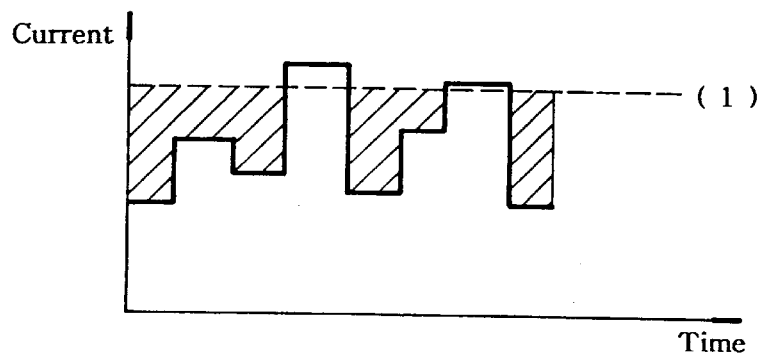

For example, as shown in FIG. 4B, when the capacity of the DC/DC converter is set to (1) of FIG. 4A, the charged capacity (hatching area of FIG. 4B) of the auxiliary battery becomes higher than the discharged capacity, that is, the battery is overcharged and the selected capacity of the DC/DC converter is proven to be too high.

Figure 4C:
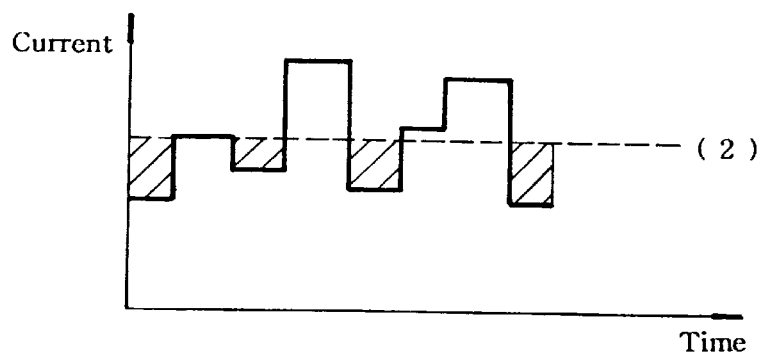
Figure 4D:
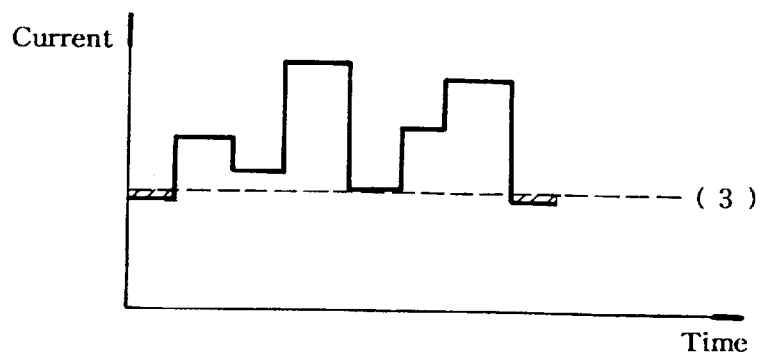

To the contrary, as shown in FIG. 4D when the capacity of the DC/DC is set to (3) of FIG. 4A, the charged capacity is too low, and the battery is gradually discharged and finally loses its inherent function. That is, the auxiliary electric source system cannot sufficiently satisfy the user, and sometimes, for example, the emergency lamp cannot be turned ON.

However, as shown in FIG. 4C, it is ideal when the capacity of the DC/DC converter is set such that the amount of a charged capacity and the amount of a discharged capacity of the auxiliary battery are the same.

That is, a capacity of the DC/DC converter, where the amount of the charged capacity and the discharged capacity of the battery are the same as each other, is the optimal capacity of the DC/DC converter.

By the optimization of the capacity of the DC/DC converter according to the present invention the size of the DC/DC converter can be compact.

Also, the capacity of the auxiliary battery can also be optimized and be compact. The capacity of the auxiliary battery can be selected by the following method.

After determining the capacity of the DC/DC converter, with reference to the modelling of the total load and capacity of the DC/DC converter, namely FIG. 4C, the maximum discharged capacity after charging can be the capacity of the auxiliary battery.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. A method for determining an optimal capacity of a DC/DC converter for an electric vehicle, comprising the steps of;

statistically modelling firm loads and instantaneous loads with frequency and duty-on ratio;

summing up firm loads;

arranging instantaneous loads in a way in which a turn-ON time of each instantaneous load does not occur simultaneously during a cycle in which another instantaneous load occurs;

obtaining a total load by summing up the instantaneous loads and the firm loads during a Particular cycle; and determining a capacity of the DC/DC converter such that, during the cycle, the amount of a charged capacity and the amount of a discharged capacity of an auxiliary battery are approximately the same.

2. The method as recited in claim 1, wherein the instantaneous loads are step functions.

3. The method as recited in claim 1, further comprising the step of charging the auxiliary battery when the total load is below a predetermined level.

4. The method as recited in claim 1, further comprising the step of discharging the auxiliary battery when the total load is above a predetermined level.

* * * * *